C. R. STURDEVANT.
SPLICE BAR AND RAIL BOND.
APPLICATION FILED MAY 5, 1911.
1,023,340.
Patented Apr. 16, 1912.
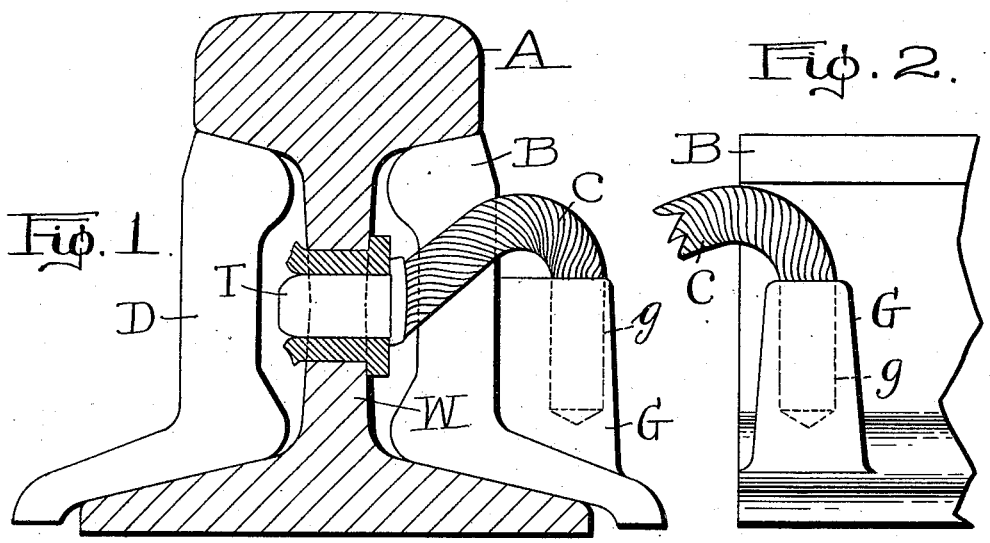
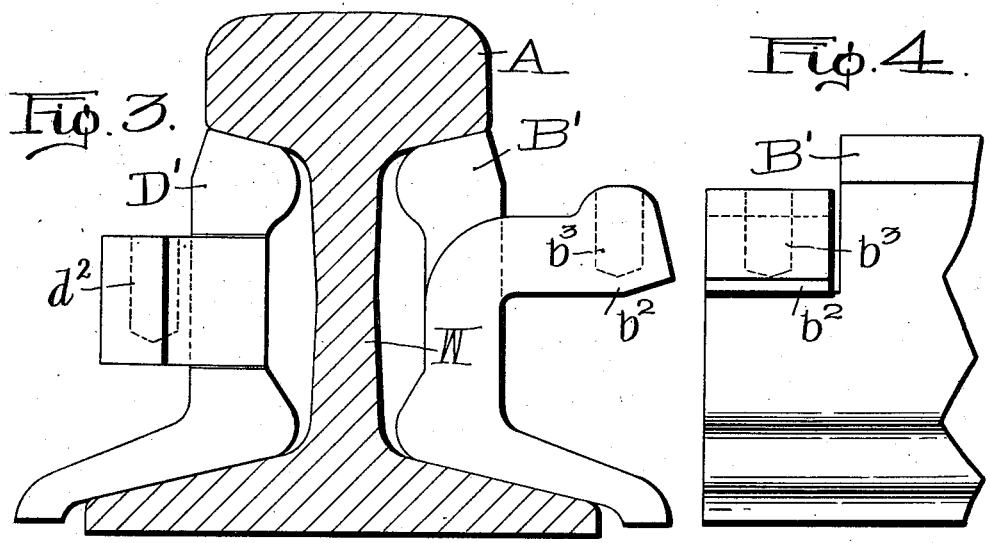
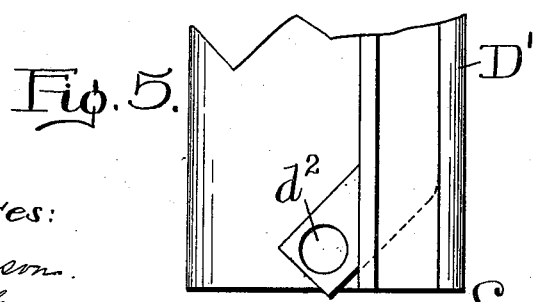

UNITED STATES PATENT OFFICE.

CHARLES R. STURDEVANT, OF WORCESTER, MASSACHUSETTS.

SPLICE-BAR AND RAIL-BOND.

1,023,340.  Specification of Letters Patent.  Patented Apr. 16, 1912.

Application filed May 5, 1911. Serial No. 625,339.

*To all whom it may concern:*

Be it known that I, CHARLES R. STURDEVANT, a citizen of the United States, residing at Worcester, in the county of Worcester and State of Massachusetts, have invented a new and useful Splice-Bar and Rail-Bond, of which the following is a specification.

This invention relates to the bonding of rails by electrically connecting the splice bars with the rails.

The principal objects of the invention are to provide a system of bonding in which a short flexible conductor can be used so that it will not afford any incentive for theft, and will not be liable to mechanical breakage from external causes; in which the flexible conductor will not be cramped in such a narrow space that it will be liable to crystallization and early breakage; in which the installation or renewal of the bond will not necessitate the removal of the splice bars and can be accomplished very rapidly and easily, and yet its removal by a common thief will be very difficult if not impossible, except by cutting the conductor; and in which splice bars high in conductivity, can be utilized as integral parts of bond conductors, without drilling holes through them.

Further objects and advantages of the invention will appear hereinafter.

Reference is to be had to the accompanying drawings, in which—

Figure 1 is a transverse sectional view of a rail showing the ends of the splice bars therefor in elevation and the bond applied thereto; Fig. 2 is a side view of the same; Fig. 3 is a view similar to Fig. 1 showing two other forms of the invention; Fig. 4 is a side view of one of the same; and Fig. 5 is a fragmentary plan of Fig. 3.

In this invention the splice bars or the like are themselves used to assist in conducting the current and provisions are made on them so that vertical or inclined bottomed or cup shaped holes can be made therein for the reception of rail bond conductor ends. Preferably the holes are drilled into projections or bent sections provided at their ends. The rail A is perforated and a terminal T is secured in the perforation by pin expansion or the like, the flexible conductor C projecting therefrom on either or both sides. The cast splice bar B is shown as having near its ends bosses G constituting cast integral parts thereof, and in each of which is drilled or cast a hole $g$. The holes should be vertical or inclined, that is the open end should be higher than the bottom or closed end, and they are bottomed so that they will hold melted solder or brazing material.

In Figs. 3 and 4 two modifications are shown. In one the splice bar B′ has a short section of its upper edge $b^2$ at each end cut and bent down into shape by a heavy press or shears so as to provide for a vertical hole $b^3$. Another modified form for obtaining these results is shown, in which, a section of the central portion of the splice bar D′ is bent back by a heavy press or otherwise so that a hole $d^2$ can be drilled easily. These bosses and bent sections offer two distinct advantages. First the vertical holes are easily drilled, and they will hold considerable solder. Secondly they can be heated for soldering or brazing very quickly and uniformly. To bond a rail joint by this method the vertical or inclined holes are first drilled in the splice bar or projections of same as above described. Then any of the well known forms of bonds now on the market, having one terminal and a suitable flexible conductor, usually copper, is attached to the rail. The terminal may be the well known pin expanded type as shown, T, Fig. 1, or it may be a compressed or soldered or steel tapered plug terminal, and the terminal evidently can be connected to the head, the flange or the web of the rail. After the installation of the terminal in the rail, the end of the conductor is inserted in the hole in the splice bar and soldered or brazed therein, by well known methods.

It is evident that this method can be used for double bonding to great advantage, in which both splice bars are utilized on each joint. If it is objected that the splice bars would be weakened by cutting out the sections shown in Fig. 3, the bars could easily be lengthened out a slight amount when first made to provide for these bent sections.

In operation the current from rail A, Fig. 1 would flow into terminal T, thence into conductor C thence into and through splice bar B, and then into the other rail through a corresponding rail bond, not shown.

It will be evident that with this bond there is little or no relative motion between rail and splice bar tending to break the conductor. The conductor C can be made very flexible, yet very short and highly conductive. Its union with the splice bar being soldered or brazed into the holes constitutes a perfect one electrically and mechanically, which is of the utmost importance as the life and efficiency of the bonded rail joint is determined almost entirely by that of the contact between the rail and the terminal T. The bond can be readily applied without the use of special tools and without removing the splice bars or renewing the bolts therefor, and the joint can be opened up electrically for any purpose with great ease, yet it cannot be removed as a whole by a common thief.

While I have illustrated and described certain preferred forms of the invention, I am aware that many other modifications can be made therein by any person skilled in the art without departing from the scope of the invention as expressed in the claims. Therefore, I do not wish to be limited to all the details of construction herein shown and described, but What I do claim is:—

1. As an article of manufacture, a splice bar having a lug cast thereon and provided with a cavity extending down into the same, said splice bar having a rail bond conductor extending from the said cavity upwardly and out around the end of the splice bar.

2. As an article of manufacture, a splice bar having a portion thereof extending outwardly and provided with a hole therein extending downwardly from the top of said outwardly extending portion, and having a rail bond conductor extending out of the top of said hole and around the end of the splice bar.

3. As an article of manufacture, a splice bar having a lug cast thereon and provided with a bottomed cavity extending down into the same.

4. As an article of manufacture, a splice bar having a portion thereof extending outwardly and provided with a bottomed hole therein extending downwardly from the top of said outwardly extending portion.

In testimony whereof I have hereunto set my hand, in the presence of two subscribing witnesses.

CHARLES R. STURDEVANT.

Witnesses:
ALBERT E. FAY,
C. FORREST WESSON.

---

Copies of this patent may be obtained for five cents each, by addressing the "Commissioner of Patents, Washington, D. C."